United States Patent
Higashiyama et al.

(10) Patent No.: US 8,375,980 B2
(45) Date of Patent: Feb. 19, 2013

(54) CLADDING ALLOY POWDER, ALLOY-CLAD MEMBER, AND ENGINE VALVE

(75) Inventors: Kiyoshi Higashiyama, Miyoshi (JP); Kimihiko Ando, Toyota (JP); Yuki Kamo, Anjo (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 88 days.

(21) Appl. No.: 13/156,432

(22) Filed: Jun. 9, 2011

(65) Prior Publication Data

US 2011/0303865 A1 Dec. 15, 2011

(30) Foreign Application Priority Data

Jun. 11, 2010 (JP) .................................. 2010-134324

(51) Int. Cl.
*F16K 1/42* (2006.01)
(52) U.S. Cl. ...................... 137/375; 251/368; 420/588
(58) Field of Classification Search .................. 251/368; 137/375; 420/580, 588
See application file for complete search history.

(56) References Cited

U.S. PATENT DOCUMENTS

| | | | | |
|---|---|---|---|---|
| 1,057,423 A | * | 4/1913 | Haynes | 420/588 |
| 3,410,732 A | * | 11/1968 | Smith | 428/656 |
| 4,332,616 A | * | 6/1982 | Morishita et al. | 75/243 |
| 4,389,251 A | * | 6/1983 | Simm et al. | 427/451 |
| 6,082,317 A | * | 7/2000 | Takahashi et al. | 123/188.8 |
| 6,248,292 B1 | * | 6/2001 | Ando et al. | 420/585 |
| 6,613,120 B2 | * | 9/2003 | Ando et al. | 428/546 |
| 6,866,816 B2 | * | 3/2005 | Liang et al. | 420/12 |
| 7,144,440 B2 | * | 12/2006 | Ando | 419/38 |

FOREIGN PATENT DOCUMENTS

| | | |
|---|---|---|
| JP | 2970670 B1 | 8/1999 |
| JP | 11-310854 A | 11/1999 |
| JP | 2001-181807 A | 7/2001 |
| JP | 2004-156101 A | 6/2004 |

OTHER PUBLICATIONS

Kimihiko Ando et al.: "Hardfaced Valve and P/M Valve Seat System for CNG and LPG Fuel Engines", SAE paper 2005-01-0718.

* cited by examiner

*Primary Examiner* — John Bastianelli
(74) *Attorney, Agent, or Firm* — Sughrue Mion, PLLC (57) ABSTRACT

A cladding alloy powder consisting of: 0.7 to 1.0 mass % C; 30 to 40 mass % Mo; 20 to 30 mass % Ni; 10 to 15 mass % Cr; and a balance including Co and unavoidable impurities, or consisting of: 0.2 to 0.5 mass % C; 30 to 40 mass % Mo; 20 to 30 mass % Ni; and a balance including Co and unavoidable impurities.

9 Claims, 6 Drawing Sheets

CLADDING ALLOY POWDER, ALLOY-CLAD MEMBER, AND ENGINE VALVE

INCORPORATION BY REFERENCE

The disclosure of Japanese Patent Application No. 2010-134324 filed on Jun. 11, 2010 including the specification, drawings, and abstract is incorporated herein by reference in its entirety.

BACKGROUND OF THE INVENTION

1. Field of the Invention

The invention relates to a cladding alloy powder for cladding the surface of a base material and to an alloy-clad member and an engine valve that use this cladding alloy powder. The invention more particularly relates to a cladding alloy powder that is well suited for high-temperature environments and to an alloy-clad member and an engine valve that use this cladding alloy powder.

2. Description of the Related Art

Heat-resistant steel is used for machinery that is employed in high-temperature atmospheres, e.g., the intake valves and exhaust valves of internal combustion engines, in order to improve, for example, the wear resistance. In particular, the valve face of the engine valve and the like must exhibit wear resistance, heat resistance, thermal impact resistance, and a low capacity to damage mating members, over a wide temperature range from ambient temperature to high temperatures. Accordingly, the heat-resistant steels typically used as a valve material do not adequately exhibit these properties. As a consequence, these properties are provided by melting a cladding powder alloy that has these properties and cladding (overlaying) this on the valve face. In the particular case of engines fueled by Compressed Natural Gas (CNG), due to the weak oxidizing power of the combustion atmosphere, a cladding (overlaying) alloy powder is used that exhibits excellent oxidation properties and that readily produces an oxide film.

Such a cladding alloy powder has been introduced, for example, as a cladding alloy powder including 20 to 60 mass % Mo, 0.2 to 3 mass % C, 5 to 40 mass % Ni, and 0.1 to 10 mass % Cr with the balance being Fe and unavoidable impurities (refer, for example, to Japanese Patent No. 2970670).

Due to the limitation on the Cr content, the cladding alloy region (referred to below as the cladding alloy) of an alloy-clad material that has been clad with such a cladding alloy powder exhibits a satisfactory production of molybdenum oxide, which exhibits the most effective solid lubricity. This molybdenum oxide functions as a solid lubricant, which results in the generation of excellent properties, i.e., a high wear resistance and a relatively low capacity to damage mating members.

However, the cladding alloy described in Japanese Patent No. 2970670, while being able to provide the properties described above, does not have a satisfactory toughness, and cracking due to, for example, thermal impact, may be caused. The reason for this is believed to be as follows: the hardness of the cladding alloy is increased due to the presence in the cladding alloy of coarse primary carbides of, for example, Mo, but these primary carbides form a fracture origin and thereby lower the toughness of the cladding alloy.

In addition, these coarse primary carbides have a shape that results in a high capacity to damage mating members and end up gouging the mating member material that comes into contact with the clad member, which also results in wear of the mating member material.

SUMMARY OF THE INVENTION

The invention provides a cladding alloy powder, an alloy-clad member, and an engine valve that exhibit an increased toughness by the cladding alloy and an improved resistance to wear of the mating member materials.

As a result of extensive and intensive investigations, the inventors concluded that the amount of carbon addition (carbon content) should be regulated in order to avoid the production of the coarse primary carbides that form a fracture origin. The conclusion was drawn that this makes it possible to control the metallographic structure of the cladding alloy that has been put in place by cladding and to thereby improve the toughness and mechanical properties (impact strength, tensile strength, elongation, and so forth) of the cladding metal.

As a result of repeated research performed by the inventors based on these conclusions, the inventors made the novel finding that when the carbon is added in the range less than or equal to the limit for the carbon content that does not produce coarse primary carbides, i.e., in the range less than or equal to the eutectic point, primary carbides are not produced in the cladding alloy and the metallographic structure of the cladding alloy assumes a hypoeutectic microstructure and the previously described properties can be obtained.

Each of the aspects of the invention is based on this novel finding, and a first aspect of the invention relates to a cladding alloy powder. This cladding alloy powder consists of: 0.7 to 1.0 mass % C; 30 to 40 mass % Mo; 20 to 30 mass % Ni; 10 to 15 mass % Cr; and a balance including Co and unavoidable impurities. The alloy-clad member referenced in this Specification denotes a member including a metal base material and a cladding alloy region provided by melting the cladding alloy powder and cladding the surface of the metal base material therewith. The cladding alloy denotes a cladding alloy region that has been put in place by cladding, and this is the same component as the cladding alloy powder.

Because this cladding alloy powder uses 0.7 to 1.0 mass % C with the previously indicated Mo, Ni, and Cr contents, the coarse carbide of Mo, which forms a fracture origin, is not produced in the cladding alloy applied by cladding with the cladding alloy powder, while primary crystal α phase and γ phase are produced therein and then the carbides of Mo and Cr which have small size are produced therein. This can increase the toughness, tensile strength, and elongation of the cladding alloy over that of cladding alloys of the related art and also improves the thermal impact resistance.

However, an improvement in the wear resistance of the cladding alloy due to the carbides of Mo and Cr cannot be expected when the C content is less than 0.7 mass %. On the other hand, the coarse primary carbide of Mo is produced and the toughness, tensile strength, and elongation are reduced when the C content exceeds 1.0 mass %.

Mo is an element that strengthens the wear resistance of the cladding alloy via the eutectic carbide. By having the Mo content be 30 to 40 mass % in the first aspect of the invention, the wear resistance of the cladding alloy is improved due to the production of the eutectic carbide in the cladding alloy and, when a member on which the cladding alloy has been formed is used, the Mo at its surface oxidizes and a molybdenum oxide film is formed. This molybdenum oxide functions as a solid lubricant, which results in an improved wear resistance for the cladding alloy and mating member materials.

However, as is also clear from the examples provided below, the wear resistance effect referenced above cannot be satisfactorily manifested when the Mo content is less than 30 mass %, while the toughness of the cladding alloy declines when the Mo content exceeds 40 mass %.

Ni is an element that improves the toughness of the cladding alloy. The toughness of the cladding alloy is improved in the invention by having the Ni content be 20 to 30 mass %. However, since Ni changes the solid solubility limit of C, at an Ni content less than 20 mass % the previously described primary carbide is produced and the capacity to damage mating members is increased. On the other hand, when the Ni content exceeds 30 mass %, the hardness of the cladding alloy declines and the wear resistance of the cladding alloy ends up declining.

Cr is an element that strengthens the wear resistance of the cladding alloy via the eutectic carbide. The eutectic carbide is produced and the wear resistance of the cladding alloy is thereby improved in the invention by having the Cr content be 10 to 15 mass %. However, as is also clear from the examples provided below, the primary carbide of Mo is produced in the cladding alloy when the Cr content is less than 10 mass %. On the other hand, the toughness of the cladding alloy is diminished when the Cr content exceeds 15 mass %.

A second aspect of the invention relates to a cladding alloy powder. This cladding alloy powder consists of: 0.2 to 0.5 mass % C; 30 to 40 mass % Mo; 20 to 30 mass % Ni; and a balance including Co and unavoidable impurities.

Because this cladding alloy powder uses 0.2 to 0.5 mass % C with the previously indicated Mo and Ni contents, primary carbides, which are a fracture origin, are not produced in the cladding alloy applied by cladding with the cladding alloy powder, while the eutectic carbide of Mo is produced. This can improve the toughness, tensile strength, and elongation of the cladding alloy over that of cladding alloys of the related art and improves the thermal impact resistance.

However, when the C content is less than 0.2 mass %, an improvement in the wear resistance of the cladding alloy due to the carbide of Mo cannot be expected and the cladding production performance (clad ability) by the molten cladding alloy powder may be impaired. In addition, when the C content exceeds 0.5 mass %, the primary carbide of Mo is produced and the toughness, tensile strength, and elongation of the cladding alloy are reduced.

In addition, as with the previously described first aspect of the invention, the wear resistance of the cladding alloy is improved by having the Mo content be 30 to 40 mass % due to the production of the eutectic carbide of Mo and due also to the production of molybdenum oxide when in use. However, this effect cannot be satisfactorily manifested when the Mo content is less than 30 mass %. On the other hand, the toughness of the cladding alloy declines when the Mo content exceeds 40 mass %.

Moreover, the toughness of the cladding alloy is improved, as with the previously described first aspect of the invention, by having the Ni content be 20 to 30 mass %. However, the capacity to damage mating members is increased when the Ni content is less than 20 mass %, while the hardness of the cladding alloy declines when the Ni content exceeds 30 mass %.

In each of the previously described aspects of the invention, the cladding alloy powder may contain at least 35 mass % Co. The hardness of the Co, which forms the matrix for the previously referenced eutectic carbides, can be raised and the wear resistance of the cladding alloy can be increased by using a Co content in this range.

Furthermore, an increase in the hardness of the matrix of the cladding alloy results in an inhibition of plastic deformation of the cladding alloy region when a member on which the cladding alloy has been formed is brought into contact with a mating member material. As a consequence, while the molybdenum oxide film formed on the surface of the cladding alloy is brittle, the molybdenum oxide film does not undergo rupture because almost no plastic deformation of the cladding alloy region occurs. This makes it possible as a result to inhibit the adhesive wear with mating member materials that is caused by rupture of the molybdenum oxide film. Higher Co contents are more desirable, and the upper limit for the Co content is the value (amount) at which the previously described element contents reach their lower limits.

A third aspect of the invention relates to an alloy-clad member. This alloy-clad member is obtained by melting the previously described cladding alloy powder and cladding a target material therewith. A fourth aspect of the invention relates to an engine valve. This engine valve may include: a valve seat; a valve face that contacts this valve seat; and the previously described alloy-clad member clad on the valve face. The use of this valve makes it possible to improve the thermal impact characteristics and wear resistance of the surface of the valve face and to also increase the wear resistance of the valve seat, which is a mating member material.

Each of the previously described aspects of the invention can increase the toughness of the cladding alloy and can improve the resistance to wear of a mating member material by the cladding alloy.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Preferred example embodiments of the invention are specifically described below based on examples.

EXAMPLE 1

A cladding alloy powder that satisfied the content conditions of C: 0.7 to 1.0 mass %, Mo: 30 to 40 mass %, Ni: 20 to 30 mass %, Cr: 10 to 15 mass %, and balance including Co and unavoidable impurities, was first prepared as a cladding alloy powder corresponding to an example of the invention.

Specifically, a cladding alloy (alloy in which Co formed the matrix) with the composition C: 0.9 mass %, Mo: 30 mass %, Ni: 20 mass %, Cr: 10 mass %, and balance including Co (Co: at least 35 mass %) and unavoidable impurities, was melted at a temperature of at least 1700° C. and a cladding alloy powder was produced using a gas atomizer in which an inert gas is used. This cladding alloy powder was classified into the 44 to 180 μm range. A Co-30Mo-10Cr-20Ni-0.9C cladding alloy powder was obtained as a result.

Figure 1:
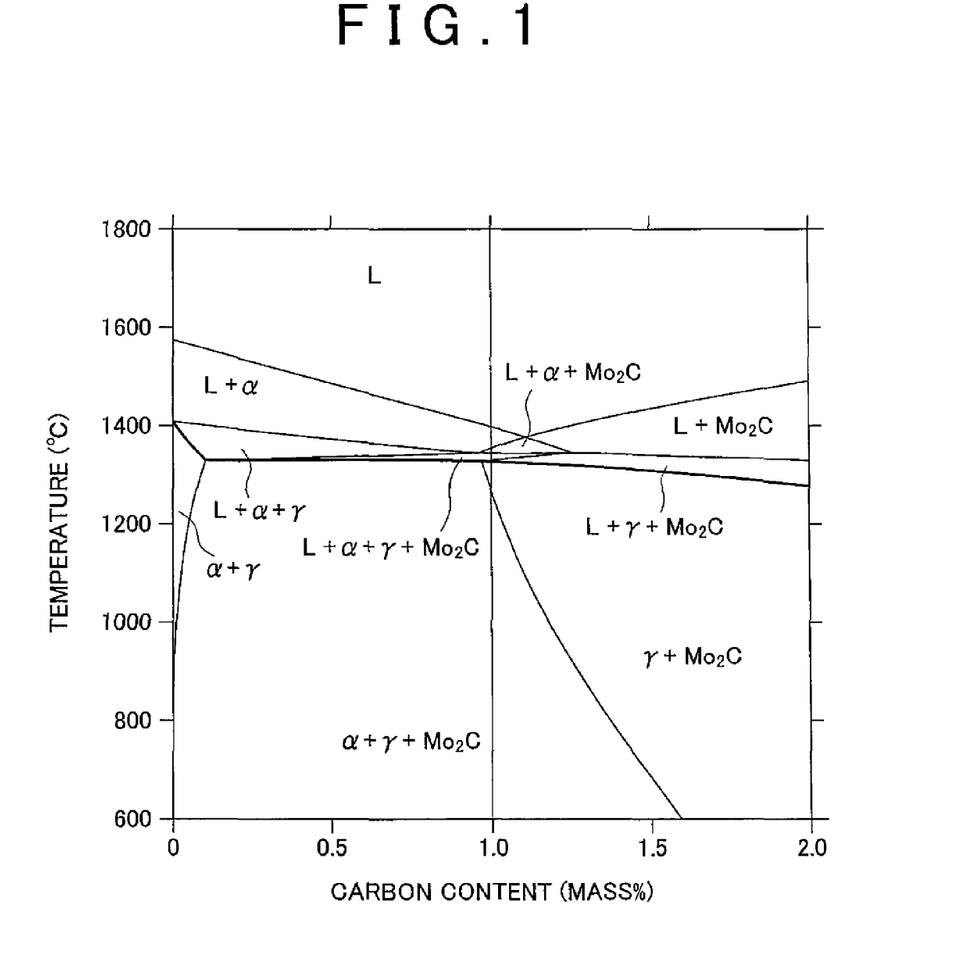
FIG. 1 is a phase diagram of the cladding alloy in an example embodiment according to the invention.

The 1.0 mass % upper limit for the C content in the cladding alloy powder was established as follows. Specifically, a phase diagram in which the C content was varied, as exemplified in FIG. 1, was first constructed using a Thermo-Calc integrated thermodynamic computation system (from Thermo-Calc Software AB) and using the previously indicated ranges for the Mo, Ni, and Cr contents. The Mo, Ni, and Cr contents in the phase diagram shown in FIG. 1 corresponded to the content conditions in the previously indicated ranges at which the primary carbide of Mo was most readily produced; the upper limit for the C content, which corresponds to the eutectic point, was 1.0 mass % in this phase diagram. Accordingly, when the C content is less than or equal to 1.0 mass % with the previously indicated Mo, Ni, and Cr content ranges, a hypoeutectic microstructure (eutectic carbides of, e.g., Mo and Cr) crystallizes, and when this value is exceeded the coarse primary carbide of Mo is produced.

Figure 8:
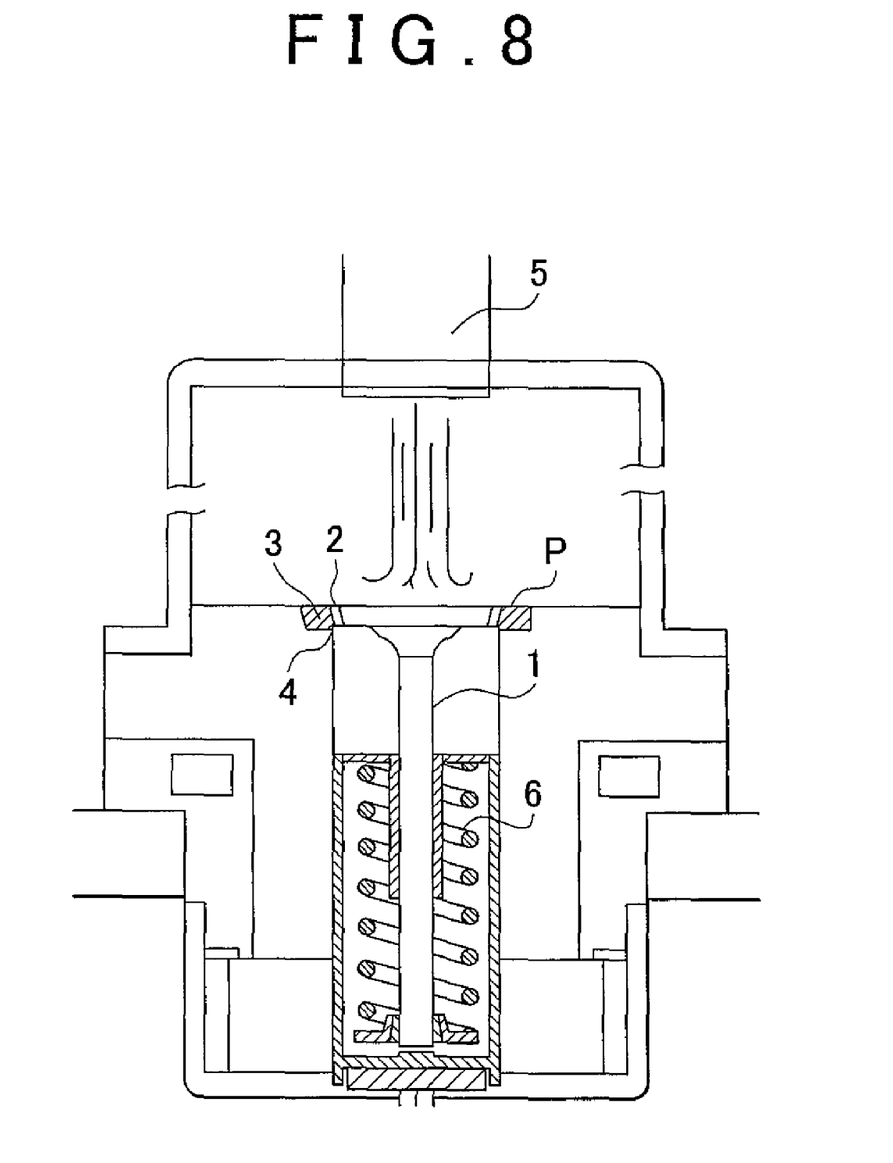
FIG. 8 is a cross-sectional diagram that shows the essential features of a test stand for measuring the wear resistance and the capacity to damage a mating member.

Then, as shown in FIG. 8, the valve face 2 of an austenitic heat-resistant steel (JIS (Japanese Industrial Standards) SUH35) engine valve was clad (overlaid) by plasma welding at an output of 100 A and a processing speed of 5 mm/sec with the molten cladding alloy powder provided by heating and melting the cladding alloy powder at a temperature of at least 1700° C. This yielded an engine valve (alloy-clad member) 1 that had cladding alloy 4 formed on the valve face 2. Test specimens with the same composition were fabricated in conformity to each of the tests described below.

EXAMPLE 2

A cladding alloy powder that satisfied the content conditions of C: 0.2 to 0.5 mass %, Mo: 30 to 40 mass %, Ni: 20 to 30 mass %, and balance including Co and unavoidable impurities, was prepared as a cladding alloy powder corresponding to an example of the invention.

Specifically, a cladding alloy (alloy in which Co formed the matrix) with the composition C: 0.5 mass %, Mo: 30 mass %, Ni: 20 mass %, and balance including Co (Co: at least 35 mass %) and unavoidable impurities, was melted at a temperature of at least 1700° C. and a cladding alloy powder was produced using a gas atomizer in which an inert gas is used. This cladding alloy powder was classified into the 44 to 180 μm range. A Co-40Mo-20Ni-0.5C cladding alloy powder was obtained as a result.

Figure 2:
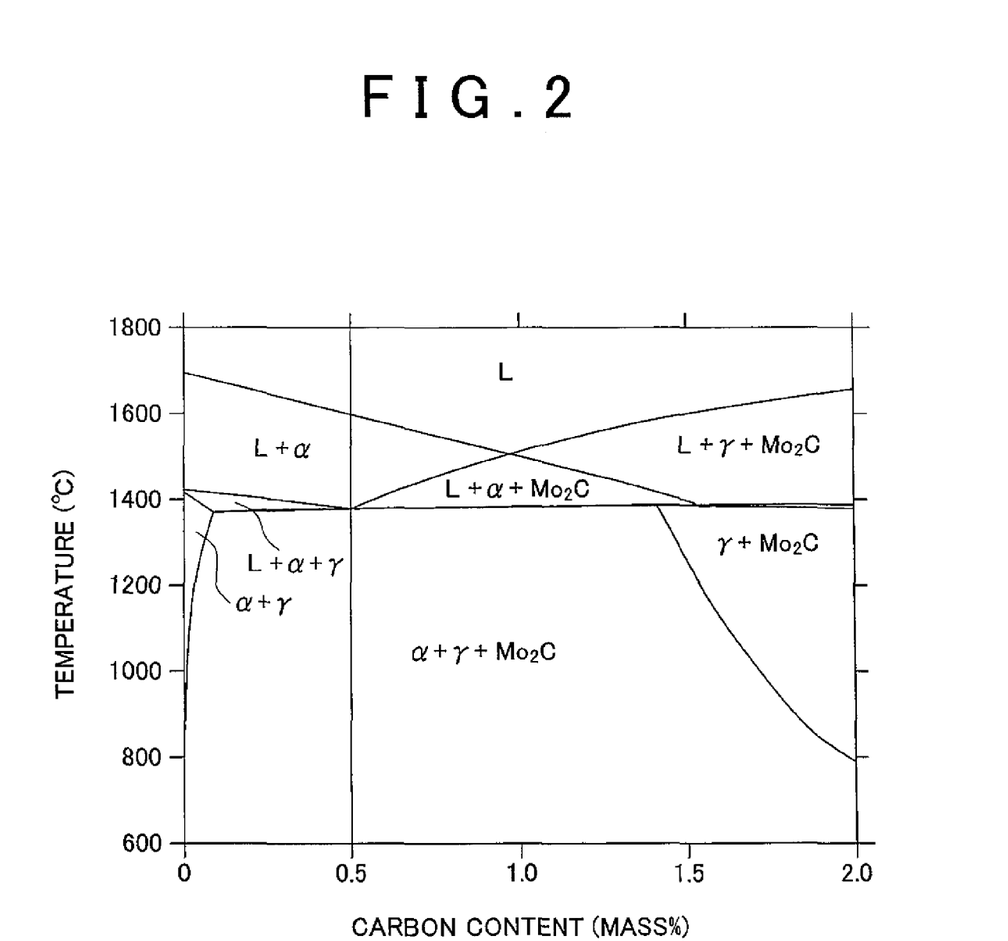
FIG. 2 is a phase diagram of the cladding alloy in an example embodiment according to the invention.

Using the previously indicated Thermo-Calc integrated thermodynamic computation system, the 0.5 mass % upper limit for the C content in the cladding alloy powder was established, as in Example 1, from a phase diagram in which the C content was varied, as exemplified in FIG. 2, wherein the previously indicated ranges were used for the Mo and Ni. The Mo and Ni contents in the phase diagram shown in FIG. 2 corresponded to the content conditions in the previously indicated ranges at which the primary carbide of Mo was most readily produced; the upper limit for the C content, which corresponds to the eutectic point, was 0.5 mass % in this phase diagram. Accordingly, when the C content is less than or equal to 0.5 mass % with the previously indicated Mo and Ni content ranges, a hypoeutectic microstructure (eutectic carbide of Mo) is formed, and when this value is exceeded the primary carbide of Mo is produced.

Then, as shown in FIG. 8, the valve face 2 of an austenitic heat-resistant steel (JIS SUH35) engine valve 1 was clad (overlaid) by plasma welding at an output of 100 A and a processing speed of 5 mm/sec with the cladding alloy 4 using the molten cladding alloy powder provided by heating and melting the cladding alloy powder at a temperature of at least 1700° C. Test specimens with the same composition were fabricated in conformity to each of the tests described below.

COMPARATIVE EXAMPLE 1

An engine valve clad (overlaid) with the cladding region was fabricated as in Example 1. The composition of the cladding alloy powder, however, was different from that in Example 1. Specifically, to obtain the cladding alloy powder, a cladding alloy (alloy in which Co formed the matrix) with C: 0.84 mass %, Mo: 33 mass %, Fe: 14 mass %, Ni: 10.2 mass %, Cr: 3.8 mass %, Mn: 6 mass %, Si: 0.89 mass %, and balance of Co and unavoidable impurities, was melted and a cladding alloy powder was produced using a gas atomizer and an inert gas and this was classified into the same range. The Co-33Mo-10.2Ni-3.8Cr-6Mn-14Fe-0.84C-0.89Si cladding alloy powder obtained as a result was used. Test specimens with the same composition were fabricated in conformity to each of the tests described below.

Evaluation Testing 1

[Microstructural Observations]

Figure 3A:
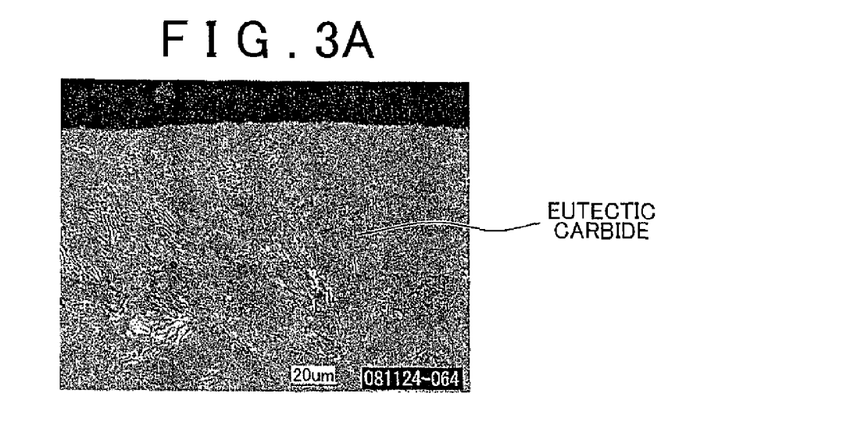
FIG. 3A is photograph of the cross-sectional microstructures of cladding alloys, and is the cross-sectional microstructure of the cladding alloy of Example 1.
Figure 3B:
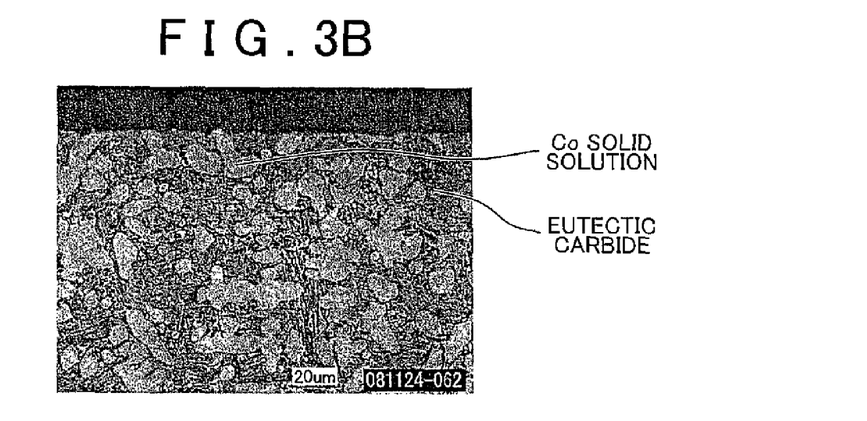
FIG. 3B is photograph of the cross-sectional microstructures of cladding alloys, and is the cross-sectional microstructure of the cladding alloy of Example 2.
Figure 3C:
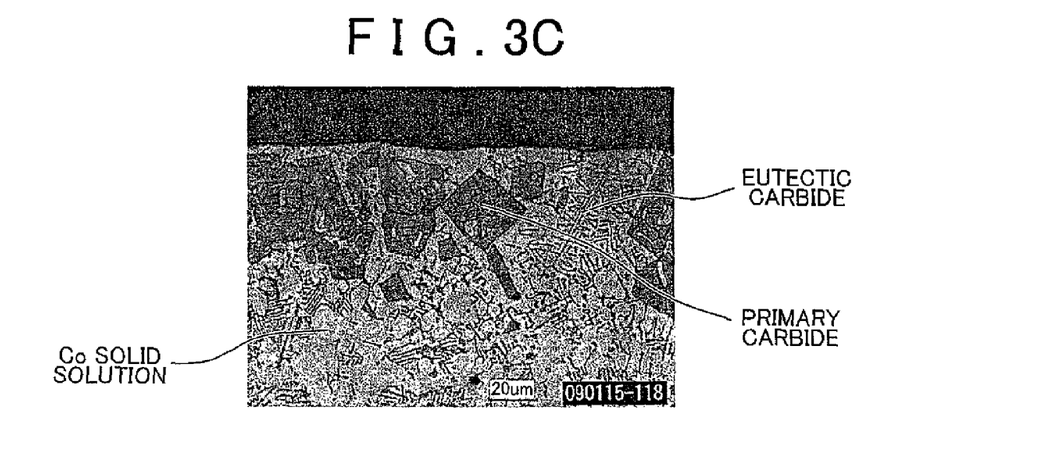
FIG. 3C is photograph of the cross-sectional microstructures of cladding alloys, and is the cross-sectional microstructure of the cladding alloy of Comparative Example 1.

The cross-sectional microstructures of the cladding region (cladding alloy) of the engine valves according to Examples 1 and 2 and Comparative Example 1 were observed with an optical microscope. These results are shown in FIG. 3A to FIG. 3C. FIG. 3A to FIG. 3C contain photographs of the cross-sectional microstructures of the cladding alloys, wherein FIG. 3A is the cross-sectional microstructure of the cladding alloy of Example 1, FIG. 3B is the cross-sectional microstructure of the cladding alloy of Example 2, and FIG. 3C is the cross-sectional microstructure of the cladding alloy of Comparative Example 1.

[Measurement of the Mechanical Strength and so Forth]

The mechanical strength and so forth was measured using test specimens according to Examples 1 and 2 and Comparative Example 1. The impact value was measured by carrying out Charpy impact testing in conformity with JIS Z 2242. The results are shown in Table 1.

The tensile strength was measured by performing tensile testing (condition: room temperature) in conformity with JIS Z 2241. The tensile strength and butt elongation were also measured by performing tensile testing (condition: 600° C.) in conformity with JIS G 0567. These results are shown in Table 1.

The Vickers hardness (condition: 10 kgf) was measured by performing hardness testing (room temperature) in conformity with JIS Z 2244. The Vickers hardness (condition: 1 kgf) was also measured by performing high-temperature hardness testing (condition: 600° C.) in conformity with JIS Z 2252. These results are shown in Table 1.

In addition, each of the cladding alloy powders according to Examples 1 and 2 and Comparative Example 1 was heated and the weight was measured while raising the temperature from room temperature to 800° C. Here, $Al_2O_3$ powder and the powder of Example 1 or 2 or Comparative Example 1 were loaded in the balance and the temperature was raised while measuring the weight and the oxidation start temperature was determined based on the weight change. This result is shown in Table 1.

[Wear Testing]

Figure 4:
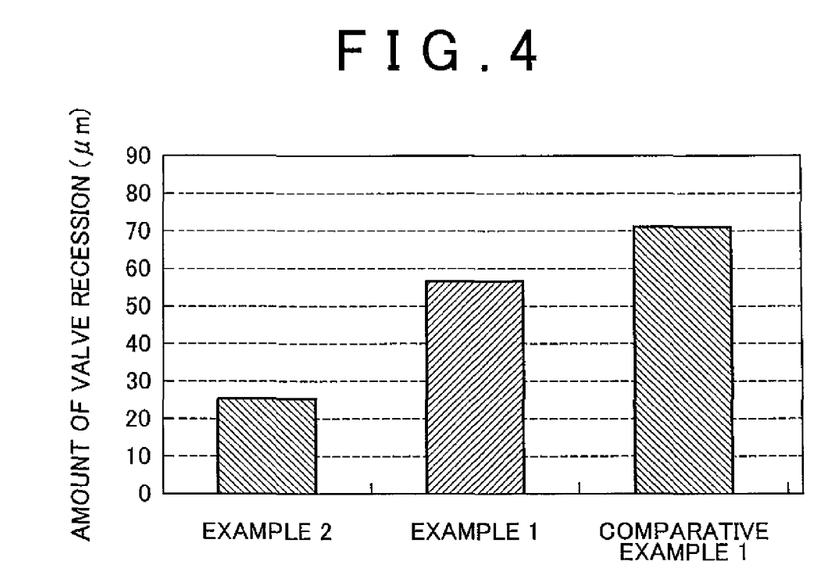
FIG. 4 is a diagram that shows the valve recession results for Examples 1 and 2 and Comparative Example 1.

Using the test stand shown in FIG. 8, the wear resistance of the cladding alloy region and the capacity of the cladding alloy region to damage a mating member were determined for the engine valves 1 according to Examples 1 and 2 and Comparative Example 1. Specifically, using a propane burner 5 for the heat source, a propane gas combustion atmosphere was generated for the sliding region between the valve face 2, clad as described above, and the valve seat 3, which was composed of an Fe-based sintered material. The temperature of the valve seat 3 was controlled to 300° C., and the spring 6 applied a load of 18 kgf during contact between the valve seat 3 and the clad valve face 2. Wear testing was performed for 8 hours by contacting the valve seat 3 with the clad valve face 2 at a rate of 2000 times/minute. The amount of valve recession from the base position P was measured in this wear test. This valve recession amount corresponds to the amount of wear (wear depth) of both due to contact the cladding alloy of the engine valve 1 with the valve seat 3. This result is shown in FIG. 4 and in Table 1 below.

parative Example 1. It was concluded as a result that the thermal impact characteristics of the cladding alloys of Examples 1 and 2 had been improved.

In addition, while the hardness may decline due to the loss of the primary carbide, the content of the Co making up the balance was larger in Examples 1 and 2 (Co: 35 to 40 mass %) than in Comparative Example 1 (Co: approximately 30 mass %), and it was thought that this was able to bring the matrix hardness to at least 577 HV.

Furthermore, it is thought that the occurrence of plastic deformation in the cladding alloy region is inhibited because the matrix in the example was harder than in the comparative example and that this results in an inhibition of the rupture of the molybdenum oxide film formed on the surface of the cladding alloy layer during a valve using the cladding alloy of the examples 1 and 2. This can prevent the cladding alloy region from damaging the valve seat mating member.

These reasons are presumed to be the cause of the smaller amount of valve recession for the engine valves in Examples 1 and 2 than for Comparative Example 1.

TABLE 1

| | impact value ($J/cm^2$) | tensile strength (MPa) | | elongation (%) | hardness (HV10) | | oxidation start temperature (° C.) | amount of valve recession (μm) |
| --- | --- | --- | --- | --- | --- | --- | --- | --- |
| | | room temperature | 600° C. | | room temperature | 600° C. | | |
| Example 1 | 9.52 | 918 | 1014 | 0.94 | 577 | 369 | 664 | 54.6 |
| Example 2 | 10.25 | 1229 | 1142 | 1.59 | 666 | 481 | 580 | 26.9 |
| Comp. Example 1 | 4.96 | 699 | 562 | 0.79 | 464 | 332 | 638 | 70.8 |

Results 1

Based on the results of the microstructural observations, and as shown in FIG. 3A to FIG. 3C, eutectic carbide (hypoeutectic microstructure) was produced in the cladding alloy of Examples 1 and 2, while the primary carbide of Mo was not produced in this cladding alloy. However, the coarse primary carbide of Mo was produced in the cladding alloy of Comparative Example 1.

Moreover, as shown in Table 1, the impact values for the test specimens of Examples 1 and 2 were higher than for Comparative Example 1. In addition, the tensile strength and elongation at room temperature and at 600° C. were higher for the test specimens of Examples 1 and 2 than for Comparative Example 1. The Vickers hardness at room temperature and at 600° C. was also higher for the test specimens of Examples 1 and 2 than for Comparative Example 1. The oxidation start temperature for Examples 1 and 2 was about the same as for Comparative Example 1.

As shown in Table 1 and FIG. 4, the amount of valve recession in Examples 1 and 2 was less than in Comparative Example 1.

Evaluation 1

Because, based on the preceding results, a carbon content of the cladding alloys of Examples 1 and 2 had was adjusted into the range less than or equal to the eutectic point as described above (the carbon content was made less than or equal to 1.0 mass % in Example 1 and was made less than or equal to 0.5 mass % in Example 2), the production of the primary carbide of Mo, which forms a fracture origin, could be avoided, and this was presumed to provide the improvement in toughness, tensile strength, and elongation over Com- EXAMPLES 3-1 and 3-2

Engine valves clad (overlaid) with the cladding region and test specimens for hardness testing were fabricated proceeding as in Example 1. The differences from Example 1 were as follows: a C content of 0.7 mass % was used in Example 3-1 and a C content of 1.0 mass % was used in Example 3-2.

EXAMPLES 4-1 to 4-3

Engine valves clad (overlaid) with the cladding region, and test specimens for hardness testing were fabricated proceeding as in Example 2. The differences from Example 2 were as follows: a C content of 0.2 mass % was used in Example 4-1 and a C content of 0.35 mass % was used in Example 4-2. Example 4-3 employed a C content of 0.5 mass % and was thus approximately the same as Example 2.

COMPARATIVE EXAMPLES 2-1 and 2-2

Engine valves clad (overlaid) with the cladding region, and test specimens for hardness testing were fabricated proceeding as in Example 1. The differences from Example 1 were as follows: a C content of 0.1 mass % was used in Comparative Example 2-1 and a C content of 0.35 mass % was used in Comparative Example 2-2.

Evaluation Testing 2

Figure 5:
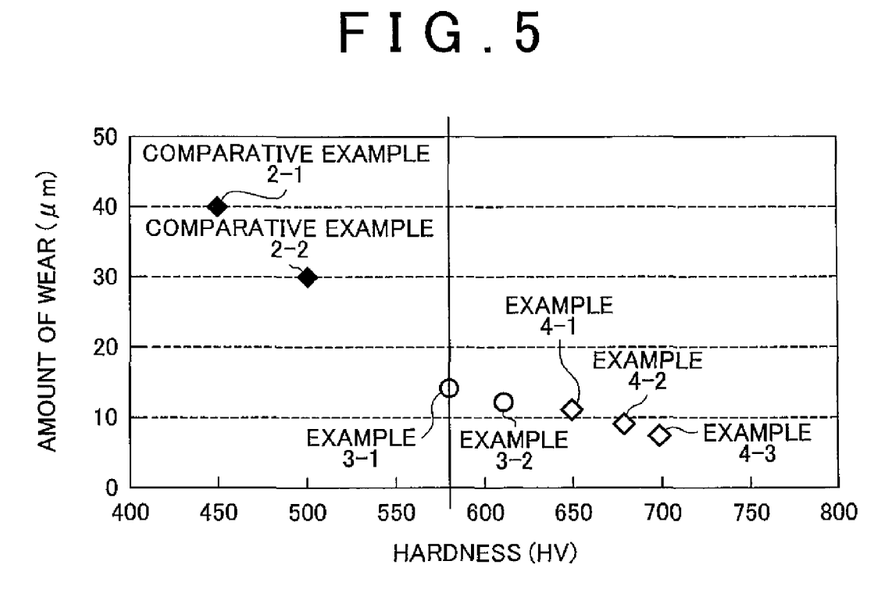
FIG. 5 is a diagram that shows the results for the amount of wear in Examples 3-1, 3-2, 4-1 to 4-3 and Comparative Examples 2-1 and 2-2.

Wear testing and hardness testing (room temperature) were performed as in Example 1 on each of Examples 3-1, 3-2, 4-1 to 4-3 and Comparative Examples 2-1 and 2-2. The results are shown in FIG. 5. The amount of wear shown in FIG. 5 indicates the maximum wear depth of the cladding alloy region itself on the engine valve.

Results 2

As shown in FIG. 5, the Vickers hardness in Examples 3-1, 3-2, 4-1 to 4-3 was higher than in Comparative Examples 2-1 and 2-2. The amount of valve recession in Examples 3-1, 3-2, 4-1 to 4-3 was smaller than in Comparative Examples 2-1 and 2-2. In addition, the amount of wear grew smaller as the hardness of the cladding alloy (test specimen) grew larger.

Evaluation 2

Due to the use of 0.7 to 1.0 mass % C in Examples 3-1 and 3-2 and the use of 0.2 to 0.5 mass % C in Examples 4-1 to 4-3, the production of the primary carbide of Mo, which is a fracture origin, is inhibited and the eutectic carbide of Mo is produced in the cladding alloy provided by cladding with the cladding alloy powder. In addition, the eutectic carbide of Cr is also produced in the case of Examples 3-1 and 3-2.

It is thought that this resulted in the higher Vickers hardness of Examples 3-1, 3-2, 4-1 to 4-3 relative to Comparative Examples 2-1 and 2-2. However, it is thought that the wear resistance of the cladding alloy brought about by the carbides of Mo and Cr cannot be satisfactorily manifested when the C content is less than 0.7 mass %, as in Comparative Examples 2-1 and 2-2.

EXAMPLES 5-1 and 5-2 (Mo Content)

Engine valves clad (overlaid) with the cladding region were fabricated proceeding as in Example 2. The difference from Example 2 was as follows: an Mo content of 30 mass % was used in Example 5-1. Since Example 5-2 used an Mo content of 40 mass %, it was approximately the same as Example 2.

COMPARATIVE EXAMPLES 3-1 and 3-2

Engine valves clad (overlaid) with the cladding region were fabricated proceeding as in Example 2. The differences from Example 2 were as follows: an Mo content of 20 mass % was used in Comparative Example 3-1 and an Mo content of 45 mass % was used in Comparative Example 3-2.

Evaluation Testing 3

Figure 6:
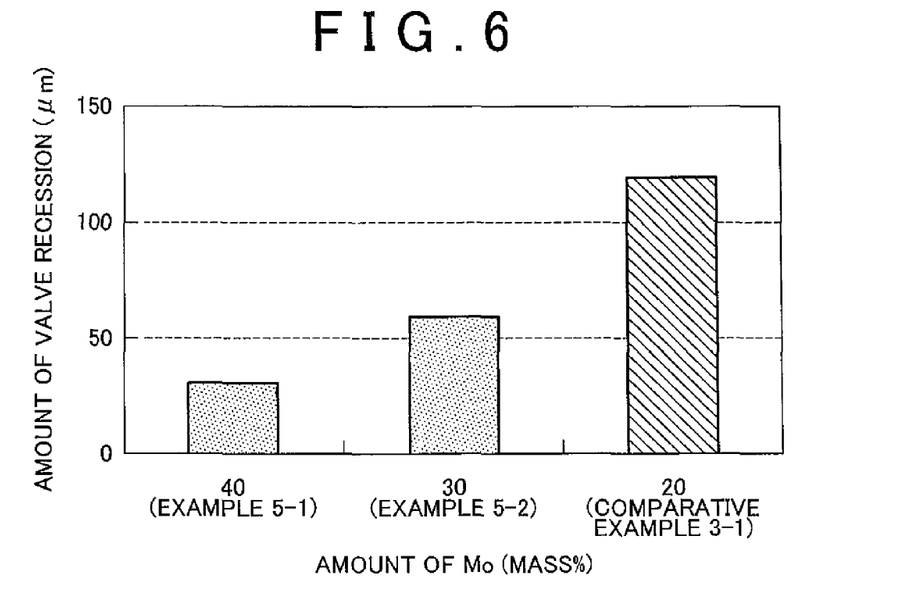
FIG. 6 is a diagram that shows the valve recession results for Examples 5-1 and 5-2 and Comparative Example 3-1.

Wear testing was performed as in Example 2 on each of Examples 5-1 and 5-2 and Comparative Example 3-1. The results are shown in FIG. 6. Impact testing was also performed as in Example 2 for Examples 5-1 and 5-2 and Comparative Examples 3-1 and 3-2. The results are shown in Table 2. The oxidation start temperature was measured as in Example 1 on the cladding alloy powders of Examples 5-1 and 5-2 and Comparative Example 3-1. These results are shown in Table 3.

TABLE 2

|  | Comparative Example 3-1 | Example 5-1 | Example 5-2 (corresponds to Example 2) | Comparative Example 3-2 |
|---|---|---|---|---|
| Mo (mass %) | 20 | 30 | 40 | 45 |
| impact value (J/cm²) | 12 | 10.3 | 9.5 | 6 |

TABLE 3

|  | Comparative Example 3-1 | Example 5-1 | Example 5-2 (corresponds to Example 2) |
|---|---|---|---|
| Mo (mass %) | 20 | 30 | 40 |
| oxidation start temperature (° C.) | >800 | 660 | 580 |

Results 3

As shown in FIG. 6, the amount of valve recession in Examples 5-1 and 5-2 was smaller than in Comparative Example 3-1. As shown in Table 2, the impact value declined in the sequence Comparative Example 3-1, Example 5-1, Example 5-2, Comparative Example 3-2 (corresponds to the increase in the Mo content). As shown in Table 3, the oxidation start temperature for the cladding alloy powders of Examples 5-1 and 5-2 was less than or equal to 660° C., which was lower than in Comparative Example 3-1.

Evaluation 3

The fact that the amount of valve recession in Examples 5-1 and 5-2 was smaller than in Comparative Example 3-1 was thought to be due to the production of the eutectic carbide of Mo and the function of Mo as an element that strengthens the wear resistance of the cladding alloy.

The fact that the impact value declined as the Mo content increased is thought to be due to an increase in the primary carbide of Mo as the Mo content increased, and it is thought that the toughness of the cladding alloy undergoes a sharp reduction when the Mo content exceeds 40 mass %.

In addition, it is thought that when a member on which the cladding alloy has been formed is used, the production of molybdenum oxide by the oxidation of the Mo at the surface is inhibited when the Mo content is less than 30 mass %, as in Comparative Example 3-1. That is, when the Mo content is at least 30 mass %, a molybdenum oxide film is easily produced at the surface of the cladding alloy also under the service environment of a typical engine valve, and this molybdenum oxide functions as a solid lubricant. The result of this is considered to be the generation of an improved wear resistance for the cladding alloy.

EXAMPLES 6-1 and 6-2 (Ni Content)

Engine valves clad (overlaid) with the cladding region were fabricated proceeding as in Example 2. The difference from Example 2 was as follows: an Ni content of 30 mass % was used in Example 6-2. Since Example 6-1 used an Ni content of 20 mass %, it was approximately the same as Example 2.

COMPARATIVE EXAMPLES 4-1 and 4-2

Engine valves clad (overlaid) with the cladding region were fabricated proceeding as in Example 2. The differences from Example 2 were as follows: an Ni content of 18 mass % was used in Comparative Example 4-1 and an Ni content of 35 mass % was used in Comparative Example 4-2.

Evaluation Testing 4

Figure 7:
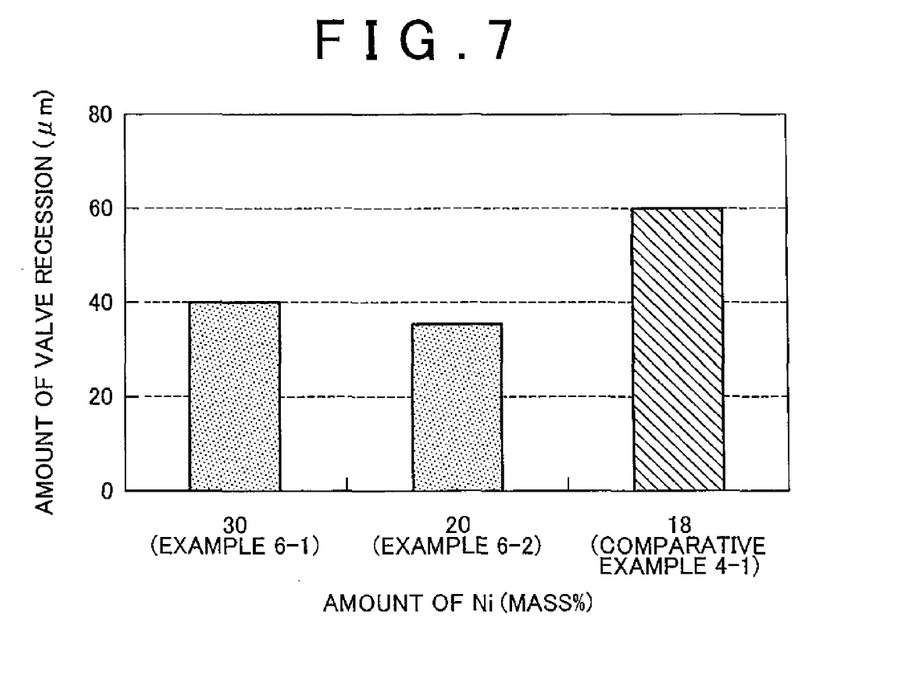
FIG. 7 is a diagram that shows the valve recession results for Examples 6-1 and 6-2 and Comparative Example 4-1.

Wear testing was performed as in Example 2 on each of Examples 6-1 and 6-2 and Comparative Example 4-1. The results are shown in FIG. 7. Hardness testing (room temperature) was performed as in Example 2 for Examples 6-1 and 6-2 and Comparative Example 4-2. The results are shown in Table 4.

TABLE 4

|  | Example 6-1 (corresponds to Example 2) | Example 6-2 | Comparative Example 4-2 |
|---|---|---|---|
| Ni (mass %) | 20 | 30 | 35 |
| hardness (HV10) | 630 | 580 | 390 |

Results 4

As shown in FIG. 7, the amount of valve recession in Examples 6-1 and 6-2 was smaller than in Comparative Example 4-1. The Vickers hardness of the test specimens of Examples 6-1 and 6-2 was higher than that of Comparative Example 4-2.

Evaluation 4

The reason for the smaller amount of valve recession in Examples 6-1 and 6-2 than in Comparative Example 4-1 was believed to be as follows. Since Ni functions to improve the toughness of the cladding alloy and also alters the solid solubility limit of C, when the Ni content is less than 20 mass %, as in Comparative Example 4-1, the previously described primary carbide is produced and the capacity to damage the mating member is increased.

When the Ni content exceeds 30 mass %, as in Comparative Example 4-2, it is thought that the Vickers hardness of the cladding alloy is then sharply reduced and wear of the cladding alloy is accelerated.

EXAMPLES 7-1 and 7-2 (Cr Content)

Engine valves clad (overlaid) with the cladding region were fabricated proceeding as in Example 1. The difference from Example 1 was as follows: a Cr content of 15 mass % was used in Example 7-2. Since Example 7-1 used a Cr content of 10 mass %, it was approximately the same as Example 1.

COMPARATIVE EXAMPLES 5-1 to 5-3

Engine valves clad (overlaid) with the cladding region were fabricated proceeding as in Example 1. The differences from Example 1 were as follows: a Cr content of 5 mass % was used in Comparative Example 5-1, a Cr content of 8 mass % was used in Comparative Example 5-2, and a Cr content of 20 mass % was used in Comparative Example 5-3.

Evaluation Testing 5

Impact testing was performed as in Example 1 on each of Examples 7-1 and 7-2 and Comparative Examples 5-2 and 5-3. The results are shown in Table 5.

Microstructural observations were carried out as in Example 1 on each of the cladding alloys of Examples 7-1 and 7-2 and Comparative Examples 5-1 and 5-2 in order to check the presence/absence of the primary carbides of Cr and so forth. The results are shown in Table 6.

TABLE 5

|  | Comparative Example 5-2 | Example 7-1 (corresponds to Example 1) | Example 7-2 | Comparative Example 5-3 |
|---|---|---|---|---|
| Cr (mass %) | 8 | 10 | 15 | 20 |
| impact value (J/cm²) | 4 | 9.5 | 9.2 | 6 |

TABLE 6

|  | Comparative Example 5-1 | Comparative Example 5-2 | Example 7-1 (corresponds to Example 1) | Example 7-2 |
|---|---|---|---|---|
| Cr (mass %) | 5 | 8 | 10 | 15 |
| primary carbide | present | present | absent | absent |

Results 5

As shown in Table 5, the test specimens of Examples 7-1 and 7-2 had higher impact values than in Comparative Examples 5-2 and 5-3. As shown in Table 6, primary carbide was observed in the cladding alloys of Comparative Examples 5-1 and 5-2, while the cladding alloys of Examples 7-1 and 7-2 were observed to contain eutectic carbides and not primary carbides.

Evaluation 5

The fact that the impact value of the test specimen of Comparative Example 5-2 was lower than that of Examples 7-1 and 7-2 was thought to be due to the production of the primary carbide of Mo when the Cr content was less than 10 mass %. When, on the other hand, the Cr content exceeds 15 mass %, as in Comparative Example 5-3, the toughness of the cladding alloy is thought to be reduced due to an increase in the carbide of Cr.

What is claimed is:

1. A cladding alloy powder consisting of:
   0.7 to 1.0 mass % C;
   30 to 40 mass % Mo;
   20 to 30 mass % Ni;
   10 to 15 mass % Cr; and
   a balance consisting of Co and unavoidable impurities.

2. The cladding alloy powder according to claim 1, wherein the cladding alloy powder contains at least 35 mass % Co.

3. The cladding alloy powder according to claim 1, wherein the cladding alloy powder contains substantially 30 mass % Mo.

4. The cladding alloy powder according to claim 1, wherein the cladding alloy powder contains substantially 20 mass % Ni.

5. An alloy-clad member, wherein the alloy-clad member is obtained by melting the cladding alloy powder according to claim 1 and cladding a target material therewith.

6. A cladding alloy powder consisting of:
   0.2 to 0.5 mass % C;
   30 to 40 mass % Mo;
   20 to 30 mass % Ni; and
   a balance consisting of Co and unavoidable impurities.

7. The cladding alloy powder according to claim 6, wherein the cladding alloy powder contains at least 35 mass % Co.

8. An alloy-clad member, wherein the alloy-clad member is obtained by melting the cladding alloy powder according to claim 6 and cladding a target material therewith.

9. An engine valve comprising:
   a valve seat;
   a valve face that contacts the valve seat; and
   the alloy-clad member according to claim 8 that is clad on the valve face.

* * * * *